PHILLIP REINBOLD, ARTHUR REINBOLD AND ALEXANDER REINBOLD.
PEA VINE HARVESTING MACHINE.
APPLICATION FILED JUNE 22, 1920.
1,373,832. Patented Apr. 5, 1921
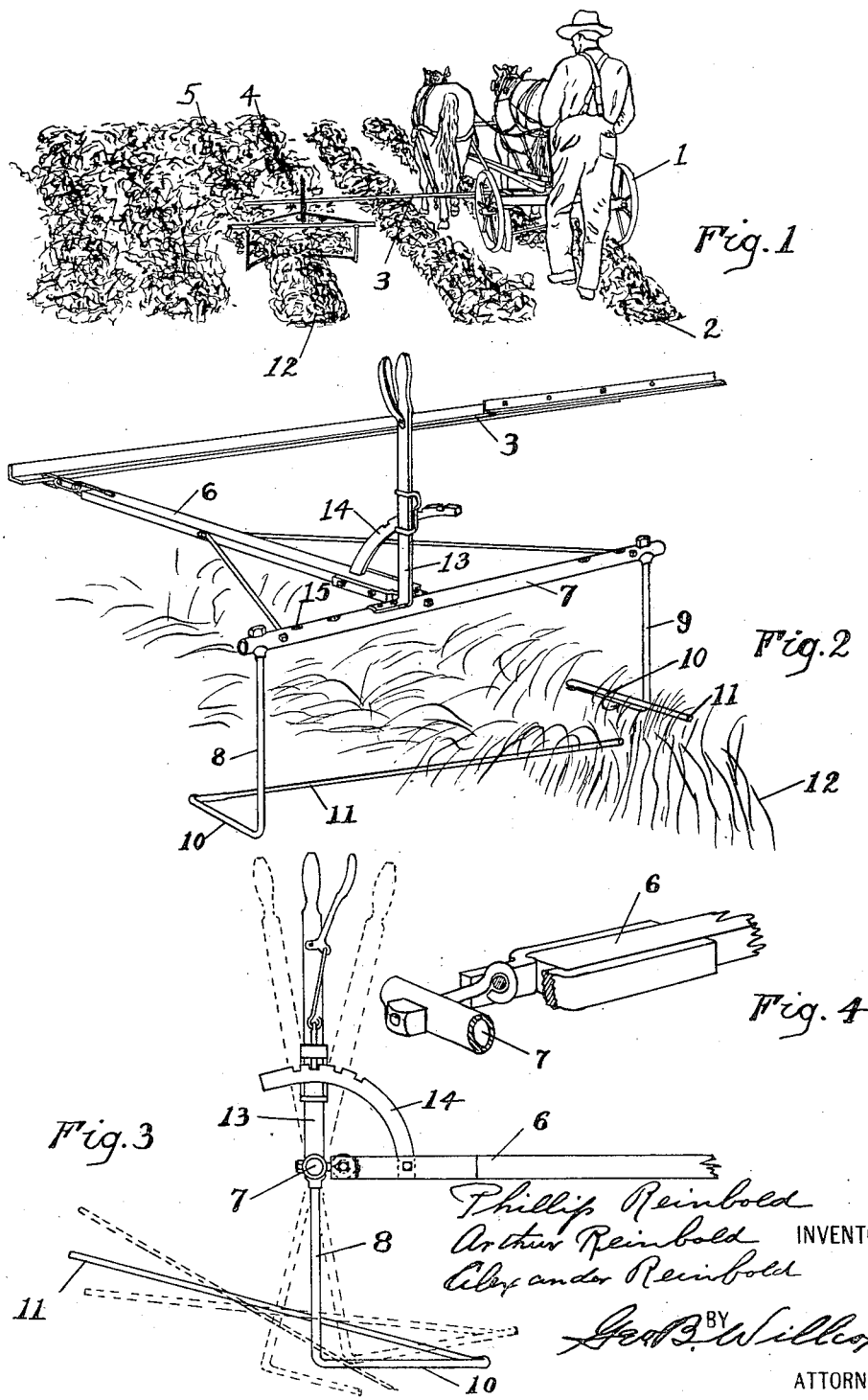

UNITED STATES PATENT OFFICE.

PHILLIP REINBOLD, ARTHUR REINBOLD, AND ALEXANDER REINBOLD, OF BLUM-
FIELD TOWNSHIP, SAGINAW COUNTY, MICHIGAN.

PEA-VINE-HARVESTING MACHINE.

1,373,832.  Specification of Letters Patent.  Patented Apr. 5, 1921.

Application filed June 22, 1920. Serial No. 390,842.

*To all whom it may concern:*

Be it known that we, PHILLIP REINBOLD, ARTHUR REINBOLD, ALEXANDER REINBOLD, citizens of the United States, all residing at Blumfield township, in the county of Saginaw and State of Michigan, have invented certain new and useful Improvements in Pea-Vine-Harvesting Machines; and we do hereby declare the following to be a full, clear, and exact description of the invention, such as will enable others skilled in the art to which it appertains to make and use the same.

This invention relates to harvesting machines and pertains more particularly to machines for harvesting peas and the like.

Our invention relates more particularly to an improved device adapted to be attached to a bean or pea-vine harvesting machine of any of the types at present in common use, the purpose of our device being to gently raise and by a folding action, to straighten up the straggling and fallen vines of one or more rows, while the harvester is simultaneously harvesting the vines of an adjacent row. The straightened vines are thereby alined in an up-standing row ready for the harvester, the ground space between the rows being cleared of fallen vines, giving free passage for the horses that draw the harvester and preventing trampling and wastage of peas.

As is well known, fields of ripened peas do not usually present clear even rows of vines, but on the contrary, the spaces between rows are more or less obstructed by fallen or sagged vines, and these vines carry a large quantity of usable peas. To draw a pea-vine cutter or harvester along such a rows of prostrate vines results in waste, both by trampling and by shaking the peas from the straggling vines as a consequence of the rough handling which the harvester gives them. It is, therefore, customary to first fold or straighten the vines of each row by manual labor before starting the harvester along the row. This is done by a person passing a long stick under the prostrate vines and lifting them to an upright position and then by pressing or striking the vines with the stick, cause them to stay in the raised position. The straggling vines on the outer sides of two adjacent rows are lifted toward each other to meet overhead, so the two straggling rows are combined into one upstanding row. The harvester then is driven along the double row thus formed and cuts the vines.

This hand method of straightening the rows is not only laborious and expensive, but also causes the loss of a considerable part of the crop by shaking the peas from the vines. Consequently such hand-straightening of the rows must be done either early in the morning or late in the evening when the vines are moist with dew.

To avoid this hand labor and consequent waste of material we have invented a simple attachment that can be easily and quickly secured to an ordinary pea-vine harvester, that requires practically no attention from the operator, and automatically passes under and picks up the straggling vines from the outer sides of two adjacent rows, lifts the vines to an upright position until those of the two sides join, thereby forming a single upright row, the ground at each side of which is clear of vines. Lifting and straightening the vines is accomplished without striking the pods or shaking out the peas to any such extent as is done by the hand method.

While the harvester is cutting the vines of one row, our improved attachment is automatically and simultaneously straightening the two other rows and combining them into a single row, ready for the harvester.

With the foregoing and certain other objects in view, which will appear later in the specification, our invention comprises the devices described and claimed and the equivalents thereof.

In the drawings, Figure 1 is a view of a part of a field of peas with the harvester and our gathering or folding attachment secured thereto.

Fig. 2 is a perspective view of the attachment, showing the manner in which it raises and straightens the vines.

Fig. 3 is a detail side elevation of the attachment, indicating in dotted lines various tilted or adjusted positions of the frame and runners.

Fig. 4 is a detail partly broken away, showing the connection between the tongue and tiltable frame.

As is clearly shown in the drawings, 1 is a pea-vine harvester of any suitable construction adapted to travel along and cut a row 2 of vines in the usual manner.

Attached to the harvester is an arm 3 that projects across the adjacent row of vines 4, or if desired, across the two adjacent rows 4 and 5. To this arm is connected a tongue 6 having a cross-frame 7 mounted thereon and capable of being slightly rotated for purposes of adjustment.

To this frame 7 may be secured, in various laterally adjusted positions, a pair of downwardly projecting bars 8, 9, spaced apart sufficiently to straddle one row or two rows of vines, as the case may be. The lower end of each bar is bent forwardly, and then inwardly, rearwardly and upwardly, to form integrally a shoe or runner 10 and an upwardly and rearwardly extending prong 11.

The runners support the weight of the device, and as they slide along the surface of the ground, their curved front ends do not cut or seize the vines, but pass underneath the stems and lift them gently from the ground. As the attachment moves forward, the upwardly and rearwardly projecting prongs 11, raise the stems gradually and without jar or tendency to break the dried pods. The stems from the outer edges of two adjacent rows are raised by the prongs to approximately upright position and are then forced inwardly until they meet, forming a single upright row 12.

The runners 10 and prongs 11 come into engagement with the under sides of the stems only and lift the vines by their stems and almost without touching the pods; consequently in practice there is almost no wastage of usable peas, as would be likely if the vine-lifting function were performed by any other method.

Another advantage of this construction is that the runners 10, preferably made of iron bars of small size, do not scrape up the dirt and pile it against and over the vines, but leave the vines clean.

When tall vines are being harvested, it is advantageous to have the rear ends of the prongs 11 elevated higher than when harvesting lower vines. The same adjustment is desirable when the front end of the tongue is elevated or lowered to connect to the arm 3 for attachment to harvesters of different heights. We, therefore, prefer to provide suitable means for raising or lowering the rear ends of the prongs. A handle 13 is preferably fixed to the cross-frame to rock it, and a suitable quadrant 14 is fixed to the tongue 6 and adapted to be engaged by the handle in its various adjusted positions.

To adjust the distance between the shoes 10 to suit different standard widths of rows, as twenty-one, twenty-four or twenty-eight inches, holes 15 are provided in the frame 7 to receive the ends of bars 8, 9.

By the means above described we have produced a vine-straightening device of extremely simple construction that can readily be attached to a pea-vine harvester to automatically straighten and arrange the adjacent rows of vines as the harvester proceeds, and to perform its work without tearing or breaking the vines and without shaking the dried peas from the vines.

Having thus described our invention, what we claim and desire to secure by Letters Patent is:

1. A vine-folding attachment for pea-harvesters and the like comprising in combination, a laterally-extending arm carried by said harvester, a frame and means connecting said frame to said arm at a point above an adjacent row of vines, a pair of downwardly projecting bars secured to said frame, runners on said bars, and upwardly, rearwardly and inwardly projecting prongs fixed to the front ends of said runners, for the purposes set forth.

2. A vine-folding attachment for pea-vine harvesting machines comprising in combination a laterally-extending arm carried by said harvester, a tongue connected to said arm at a point corresponding to the location of an adjacent row of vines, a frame rotatably adjustable on said tongue, a pair of downwardly projecting bars secured to said frame, runners formed integral with said bars, and upwardly, rearwardly and inwardly projecting prongs integral with said runners, for the purposes set forth.

3. A vine-folding attachment for pea-vine harvesting machines comprising in combination a laterally-extending arm carried by said harvester, a tongue releasably connected to said arm, a frame secured to an end of said tongue and capable of being slightly rotated with respect thereto, a handle secured to said frame, a quadrant carried by said tongue and adapted to be engaged by said handle to hold the frame in various adjusted positions, a pair of downwardly projecting bars adapted to be secured to said frame in various laterally adjusted positions, each of said bars formed at its lower end with a longitudinally disposed runner, the forward end of said runner being bent to form a rearwardly, inwardly and upwardly projecting prong adapted to pass underneath the stems of the vines and raise them to upright position, for the purposes set forth.

In testimony whereof we affix our signatures.

PHILLIP REINBOLD.
ARTHUR REINBOLD.
ALEXANDER REINBOLD.